United States Patent
Hu et al.

(10) Patent No.: US 8,295,651 B2
(45) Date of Patent: Oct. 23, 2012

(54) COHERENT PHRASE MODEL FOR EFFICIENT IMAGE NEAR-DUPLICATE RETRIEVAL

(75) Inventors: Yiqun Hu, Singapore (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1033 days.

(21) Appl. No.: 12/236,462

(22) Filed: Sep. 23, 2008

(65) Prior Publication Data

US 2010/0074528 A1  Mar. 25, 2010

(51) Int. Cl.
*G06K 9/54* (2006.01)
(52) U.S. Cl. ........ 382/305; 382/209; 382/219; 382/278; 358/537; 358/538
(58) Field of Classification Search ............ 382/209, 382/219, 278, 282; 358/537, 538, 453
See application file for complete search history.

(56) References Cited

U.S. PATENT DOCUMENTS

| | | | |
|---|---|---|---|
| 5,684,987 A * | 11/1997 | Mamiya et al. .................... 700/1 |
| 6,226,618 B1 * | 5/2001 | Downs et al. .................... 705/51 |
| 6,603,873 B1 * | 8/2003 | Gordon et al. ................. 382/144 |
| 6,897,426 B2 * | 5/2005 | Etienne-Cummings et al. ........................ 250/208.1 |
| 6,947,959 B1 * | 9/2005 | Gill ................................ 715/202 |
| 7,062,084 B2 | 6/2006 | Messing et al. |
| 7,068,787 B1 * | 6/2006 | Ta et al. ......................... 380/240 |
| 7,254,285 B1 | 8/2007 | Paek et al. |
| 7,308,139 B2 * | 12/2007 | Wentland et al. ............. 382/181 |
| 7,359,901 B2 | 4/2008 | Lee et al. |
| 7,496,670 B1 * | 2/2009 | Givoly ........................... 709/230 |
| 8,175,412 B2 * | 5/2012 | Basri et al. .................... 382/278 |
| 2005/0225678 A1 | 10/2005 | Zisserman et al. |
| 2006/0062474 A1 | 3/2006 | Paschalakis et al. |
| 2007/0127813 A1 | 6/2007 | Shah |
| 2007/0237426 A1 | 10/2007 | Xie et al. |

FOREIGN PATENT DOCUMENTS

EP   0990997 A1   4/2000

OTHER PUBLICATIONS

Bruce A. Maxwell, "Towards Object-Based Retrieval for Image Libraries", IEEE Workshop on Content-Based Access of Image and Video Libraries, (CBAIVL 2001), 2001, pp. 24-29.
Ke, et al., "Efficient Near-Duplicate Detection and Sub-Image Retrieval", in Proc. of ACM Int. Conf. on Multimedia MM'04, Oct. 10-16, 2004, 8 pages.
Zheng, et al., "Effective and Efficient Object-Based Image Retrieval Using Visual Phrases", ACM, MM'06, Oct. 23-27, 2006, pp. 77-80.
Wu, et al., "Visual Language Modeling for Image Classification", ACM, MIR'07, Sep. 28-29, 2007, pp. 115-124.

(Continued)

*Primary Examiner* — Yosef Kassa (57) ABSTRACT

A coherent phrase model for near-duplicate image retrieval enforces coherency across multiple descriptors for every local region. Two types of visual phrase (FCP and SCP) are employed to represent feature and spatial coherency and can be utilized without increasing the computational complexity. The FCP utilizes the information of different features by enforcing the feature coherency across multiple types of descriptors for every local region, and the SCP utilizes spatial information by enforcing the spatial coherency across the spatial neighborhoods of different sizes around every local region. Moreover, the disclosed model improves the matching accuracy by reducing the number of false matches and preserves the matching efficiency because of the sparsity of the representation.

20 Claims, 8 Drawing Sheets

OTHER PUBLICATIONS

Cao, et al., "Spatially Coherent Latent Topic Model for Concurrent Object Segmentation and Classification", IEEE 11th International Conference on Computer Vision, ICCV 2007, 8 pages.

Ke, et al., "PCA-SIFT: A More Distinctive Representation for Local Image Descriptors", Proceedings of the 2004 IEEE Computer Society Conference on Computer Vision and Pattern Recognition (CVPR'04), 2004, 8 pages.

Lazebnik, et al., "A Sparse Texture Representation Using Local Affine Regions", IEEE Transactions on Pattern Analysis and Machine Intelligence, vol. 27, No. 8, Aug. 2005, pp. 1265-1278.

Lazebnik, et al., "Beyond Bags of Features: Spatial Pyramid Matching for Recognizing Natural Scene Categories", Proceedings of the 2006 IEEE Computer Society Conference on Computer Vision and Pattern Recognition (CVPR'06), vol. 2, pp. 1-8.

Ling, et al., "Proximity Distribution Kernels for Geometric Context in Category Recognition", IEEE 11th International Conference on Computer Vision, ICCV 2007, 8 pages.

David G. Lowe, "Distinctive Image Features from Scale-Invariant Keypoints", Accepted for publication in the International Journal of Computer Vision, Jan. 5, 2004, pp. 1-28.

Mikolajczyk, et al., "A Performance Evaluation of Local Descriptors", IEEE Transactions on Pattern Analysis and Machine Intelligence, vol. 27, No. 10, Oct. 2005, pp. 1615-1630.

Ngo, et al., "Fast Tracking of Near-Duplicate Keyframes in Broadcast Domain with Transitivity Propagation", ACM, MM'06, Oct. 23-27, 2006, pp. 845-854.

Nister, et al., "Scalable Recognition with a Vocabulary Tree", Proceedings of the 2006 IEEE Computer Society Conference on Computer Vision and Pattern Recognition (CVPR'06), vol. 2, 2006, pp. 2161-2168.

Quack, et al., "Efficient Mining of Frequent and Distinctive Feature Configurations", IEEE 11th International Conference on Computer Vision, ICCV 2007, 8 pages.

Savarese, et al., "Discriminative Object Class Models of Appearance and Shape by Correlations", Proceedings of the 2006 IEEE Computer Society Conference on Computer Vision and Pattern Recognition (CVPR'06), vol. 2, 2006, pp. 2033-2040.

Sivic, et al., "Video Google: A Text Retrieval Approach to Object Matching in Videos", Proceedings of the Ninth IEEE International Conference on Computer Vision (ICCV'03), 2003, pp. 1-8.

"TREC Video Retrieval Evaluation (TRECVID)", http://www-nlpir.nist.gov/projects/trecvid/.

Yuan, et al., "Discovery of Collocation Patterns: from Visual Words to Visual Phrases", IEEE Conference on Computer Vision and Pattern Recognition, CVPR apos;07, Jun. 17-22, 2007, pp. 1-8.

Zhang, et al., "Detecting Image Near-Duplicate by Stochastic Attribute Relational Graph Matching with Learning", In ACM Multimedia, New York City, USA, Oct. 2004, 8 pages.

Zhang, et al., "Local Features and Kernels for Classification of Texture and Object Categories: An In-Depth Study", Research Report, Oct. 2005, 42 pages.

Zhao, et al., "Near-Duplicate Keyframe Identification with Interest Point Matching and Pattern Learning", IEEE Transactions on Multimedia, vol. 9, No. 5, Aug. 2007, pp. 1037-1048.

Belongie, et al., "Shape Matching and Object Recognition Using Shape Contexts", IEEE Transactions on Pattern Analysis and Machine Intelligence, vol. 24, No. 24, Apr. 2002, pp. 509-522.

\* cited by examiner

COHERENT PHRASE MODEL FOR EFFICIENT IMAGE NEAR-DUPLICATE RETRIEVAL

BACKGROUND

Near-duplicate image detection and retrieval is useful to the filtering, retrieval, and management of multimedia content. Image near-duplicate (IND) refers to multiple images that are close to the exact duplicate of one image, but different in scene, camera setting, photometric and digitization changes. Specifically, the scale, viewpoint, and illumination of the same scene and object(s) captured in the IND(s) can be changed by different camera settings and rendering conditions. The composition of multiple objects can be different in the IND(s) due to some editing operations.

The INDs can correlate videos that depict the same news event from different broadcast sources and provide similarity clues for recognizing visual events and searching news video clips. Detecting INDs over the Internet assist in the discovery of the unauthorized use of private images for the application of copyright infringement detection, for example. Personal photo albums can be automatically organized by grouping/removing INDs, which might be of different names. Detection and retrieval of IND can also facilitate traditional text-based web searches. If two web pages contain any INDs, the relevance between these two web pages can be increased.

Retrieval and detection are two different but related tasks for IND. IND retrieval attempts to find all images that are duplicate or near duplicate to a query. The objective of IND detection is to find all duplicate pairs from an image collection. IND detection can be formulated as a retrieval problem by taking every image in the collection as the query image.

At least two issues related to IND detection and retrieval include the large variances within INDs make this problem challenging, and by formulating detection as a retrieval problem, the number of possible IND pairs increase quadratically with the size of the database. This has an overall effect on performance for IND processing.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is an efficient and effective solution for retrieving near-duplicate images from an image database. The architecture reduces the number of false matches by using coherency and generates sparse representations of the images. A coherent phrase model is presented that incorporates the coherency of local regions. In this model, local regions are characterized by visual phrases of multiple descriptors rather than a visual word of a single descriptor to characterize local regions and to enforce local coherency.

Two types of visual phrases are presented that encode the coherency in the feature and spatial domain. In a feature coherent phrase (FCP), local regions are characterized by multiple descriptors of different types, for example, SIFT (scale-invariant feature transform) and SPIN (hereinafter referred to as spin). The match of two local regions utilizes the coherency across different types of features. Spatial coherent phrase (SCP) is where multiple descriptors of a single type of feature are generated from the spatial neighborhoods of different scales around each local region. The match of two regions utilizes the coherency across different spatial neighborhoods.

The coherent phrase model improves the effectiveness of a "Bag-of-Words" model by introducing a visual phrase that enforces the coherency across multiple descriptors to remove false matches. Second, the coherent phrase model provides an efficient framework to explore appearances/spatial relationships of local regions. The efficiency is preserved by the separation of individual words in a visual phrase and the sparsity of the representation.

Multiple descriptors of a local region can be assigned to a visual phrase by assigning each descriptor to a visual word separately. The maximum number of non-zero bins in the histogram of visual phrase frequency is the number of local regions such that the representation of image is sparse and the similarity distance can be computed quickly.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Although previous research about exact duplicate and copy detection is mainly based on image representation using global features such as color, some researchers have proposed to use the Bag-of-Words model of images to detect and retrieve near-duplicate images (also referred to as image near-duplicate (IND)). This model is, as applied to spam filtering, for example, creates bags or collections of words such as a collection of spam words and a collection of legitimate words. Generic image categorization approaches using the Bag-of-Words model are also related to IND detection and retrieval. Under this model, images are treated as documents by assigning descriptors of local regions to "visual words". Each image is then represented as a histogram of word frequency. A difficult problem is that the ambiguous visual words will introduce a large number of false matches when each region is matched independently to others.

The disclosed architecture enhances the Bag-of-Words model by using coherency and generating sparse representations of the images to reduce false matches. The Bag-of-Words model ignores the spatial information and results in the ambiguity of visual words. The disclosed architecture includes a coherent phrase model that incorporates the coherency of local regions, where local regions are characterized by visual phrases of multiple descriptors (rather than a visual word of a single descriptor) to characterize local regions and to enforce local coherency.

The coherent phrase model improves the effectiveness of the Bag-of-Words model by introducing a visual phrase that enforces the coherency across multiple descriptors. The coherent phrase model also provides an efficient framework to explore the appearance/spatial relationship of local regions. The efficiency is preserved by the separation of individual words in a visual phrase and the sparsity of the representation.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
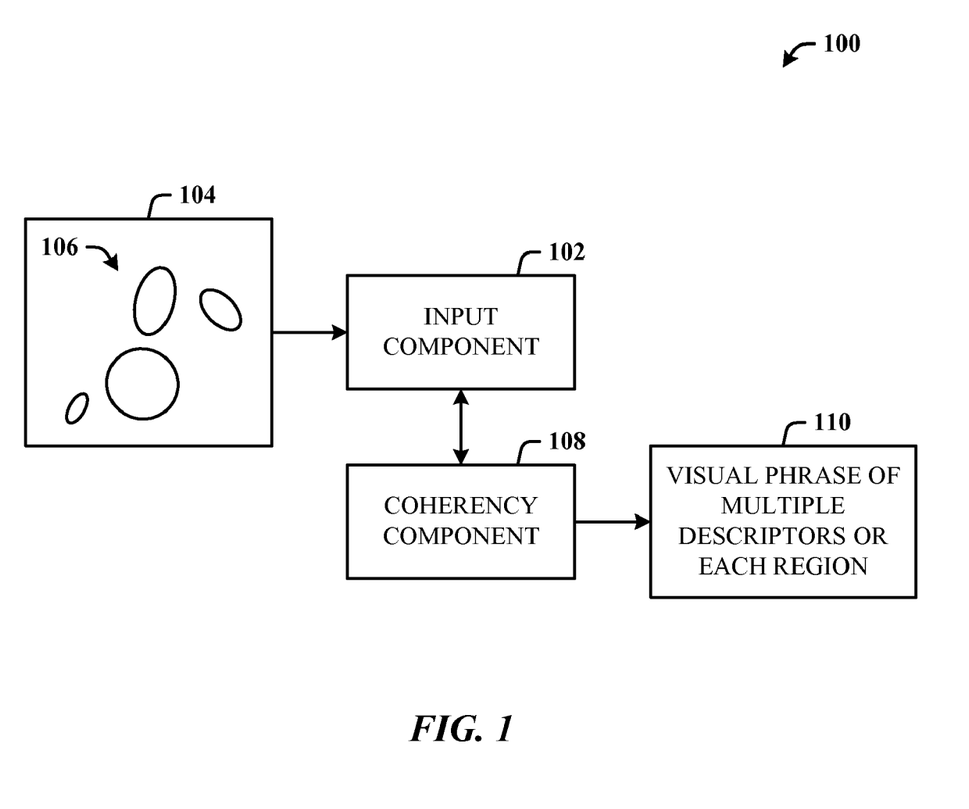
FIG. 1 illustrates a computer-implemented image processing system in accordance with the disclosed architecture.

FIG. 1 illustrates a computer-implemented image processing system 100 in accordance with the disclosed architecture. The system 100 includes an input component 102 for receiving an image 104 having local regions 106, and a coherency component 108 for characterizing each of the local regions 106 as a visual phrase of multiple descriptors 110.

The coherency component 108 generates a feature coherency phrase (FCP) that characterizes each local region by multiple descriptors of different types. The FCP can employ scale-invariant feature transform (SIFT) descriptors and spin descriptors, for example. The FCP enforces coherency across different types of features between two matched local regions. Additionally, the coherency component generates a spatial coherency phrase (SCP) where multiple descriptors of a single type are generated from spatial neighborhoods of different description scales proximate the local regions.

Figure 2:
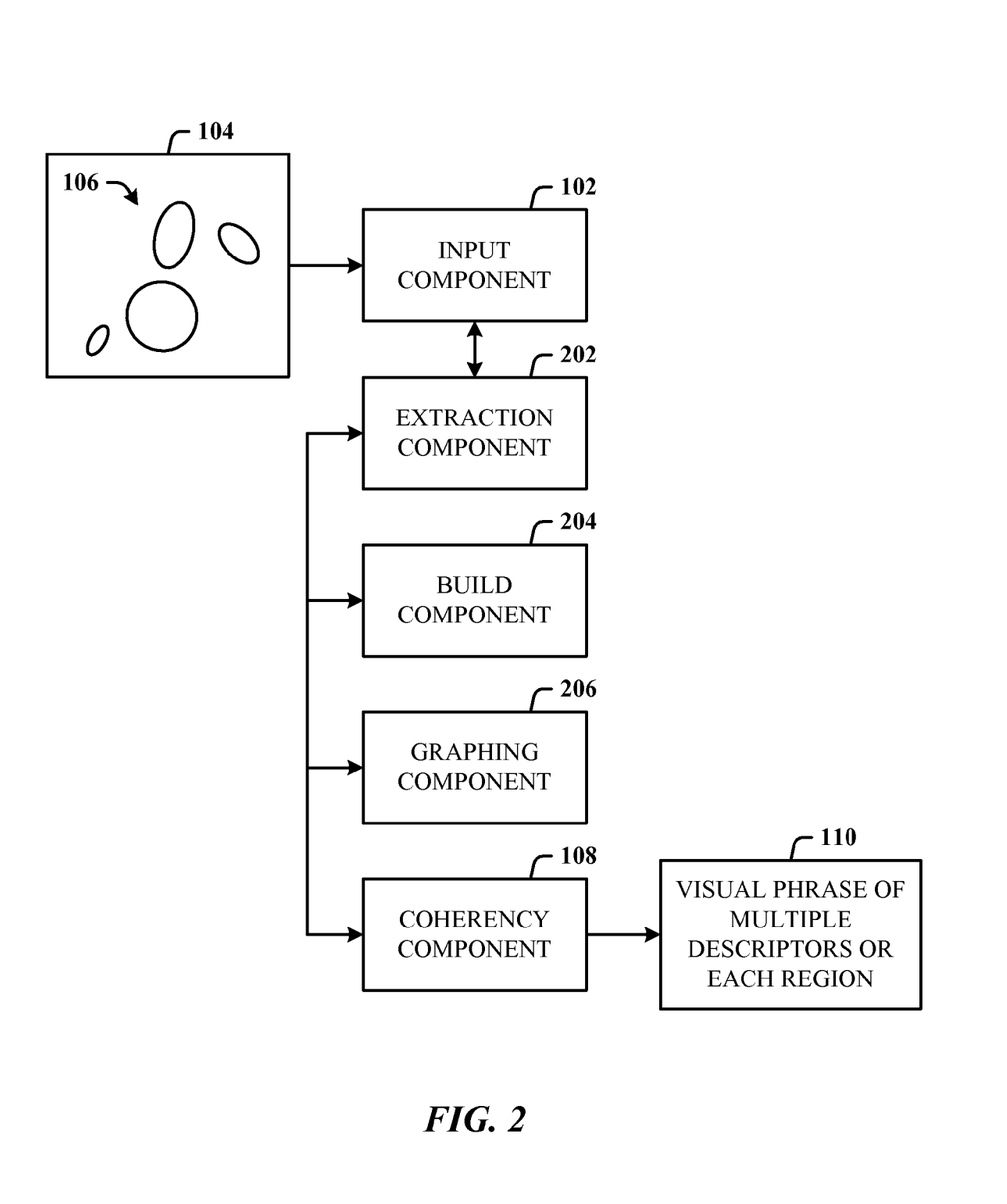
FIG. 2 illustrates an alternative implementation of an image processing system in accordance with the disclosed architecture.

FIG. 2 illustrates an alternative implementation of an image processing system 200 in accordance with the disclosed architecture. The system 200 includes the input component 102 for receiving the image 104 having the local regions 106, and the coherency component 108 for characterizing each of the local regions 106 as the visual phrase of multiple descriptors 110.

Additionally, the system 200 includes an extraction component 202 for extracting multiple descriptors from each of the local regions 106, where the multiple descriptors characterize the corresponding appearance of the local region. A build component 204 builds multiple codebooks of visual words using clustering, for example, on each type of descriptor. A graphing component 206 generates a histogram of visual phrase frequency. These components are described in greater detail herein below.

Two types of visual phrases are presented that encode the coherency in the feature and spatial domain. In the FCP, local regions are characterized by multiple descriptors of different types, for example, SIFT and spin. The match of two local regions utilizes the coherency across different types of features. SCP is where multiple descriptors of a single type of feature are generated from the spatial neighborhoods of different scales around each local region. The match of two regions utilizes the coherency across different spatial neighborhoods.

Multiple descriptors of a local region can be assigned to a visual phrase by assigning each descriptor to a visual word separately. The maximum number of non-zero bins in the histogram of visual phrase frequency is the number of local regions such that the representation of image is sparse and the similarity distance can be computed quickly.

Figure 3:
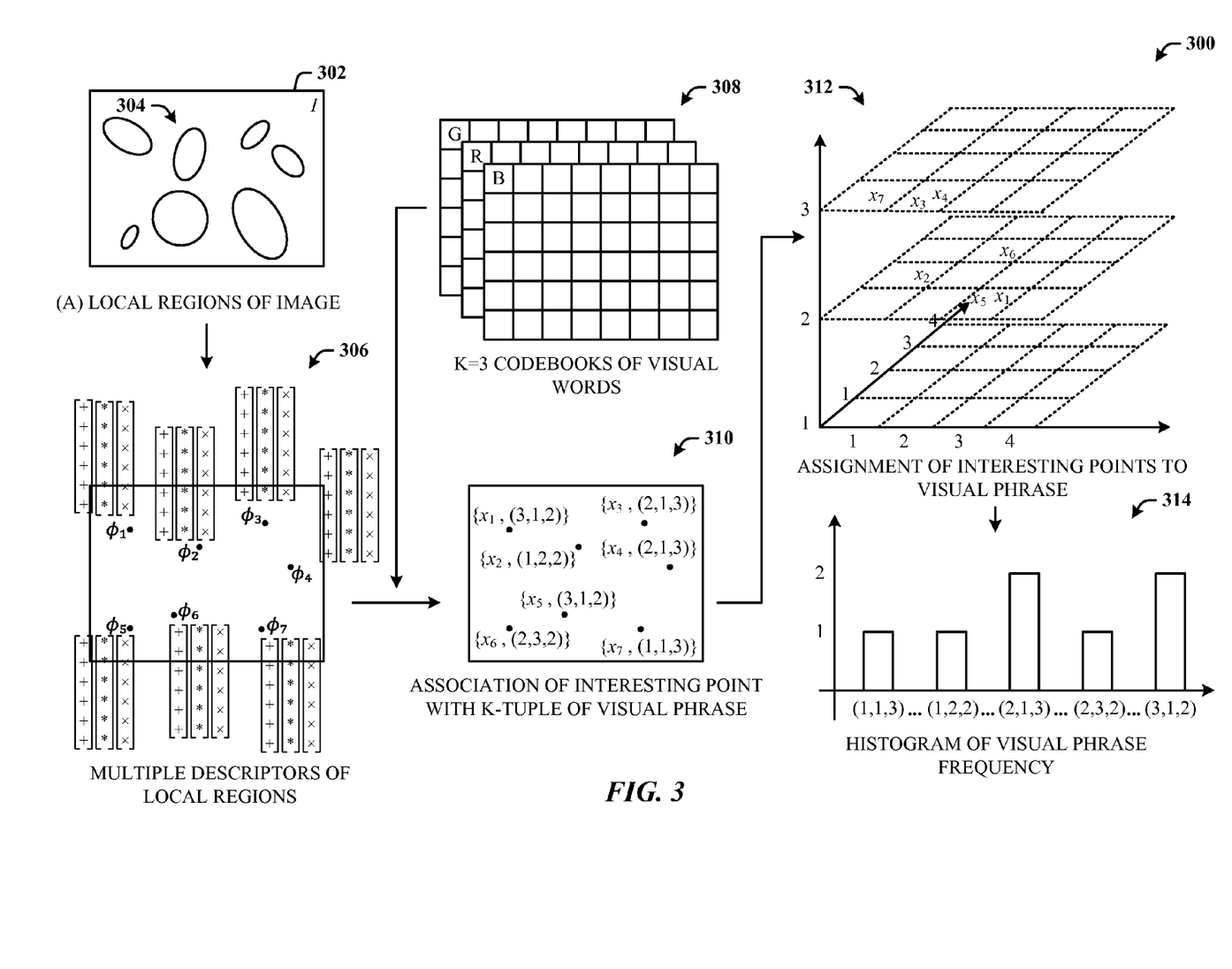
FIG. 3 illustrates an exemplary flow for generating a coherent phrase model of order three for an image.

FIG. 3 illustrates an exemplary flow 300 for generating a coherent phrase model of order three for an image. Initially, an image I 302 of local regions 304 (here, seven) is received. At 306, K=3 descriptors $\phi_i$ are extracted for every local region i. The three descriptors and descriptor types are represented by the characters (+, *, and x). At 308, three codebooks (labeled G, R, and B) of visual words are built by applying k-means clustering, for example, on each type of descriptor. At 310, each of the local regions 304 is assigned to a visual phrase (3-tuple) according to the codebooks, and associated with an "interesting" point (e.g., $x_1$, $x_2$, etc.). At 312, the interesting points are mapped to a 3D coordinate system for ultimately creating a histogram 314, which is a final representation of image I 302 as a sparse histogram of visual phrase frequency.

Following is a description of the disclosed coherent phrase model. The Bag-of-Words model, although efficient, ignores the spatial information and results in the ambiguity of visual words. The disclosed architecture uses the new coherent phrase model to enhance the standard Bag-of-Words model.

Given an image I: $\subset \mathbb{R}^2 \rightarrow \mathbb{R}^3$, M local regions can be located by using a detector or dense sampling, for example. For every local region i, a combination of K descriptors $\phi_{ik}$ are extracted from the local region to characterize the region appearances.

$$\phi_i = \{\phi_{i1}, \phi_{i2}, \ldots, \phi_{iK}\}$$

Every $\phi_{ik}$, where $k \in [1, 2, \ldots, K]$ belongs to one of the visual words and each $\phi_i$ is mapped to a K-tuple of visual words. This K-tuple is referred to as a visual phrase v, where $$v = \{v_k | k \in [1, 2, \ldots, K]\}$$

and each $v_k$ indicates a visual word. K is denoted as the order of visual phrase. By assigning every $\phi_i$ to the corresponding visual phrase, the coherent phrase model of the image is obtained as the histogram of visual phrase frequency.

Using the coherent phrase model, every local region is characterized by multiple descriptors. Multiple descriptors of every local region describe different aspects of the appearance in the image. Hence, the meaningful coherency across multiple descriptors of every local region can be incorporated. Specifically, two local regions are recognized as a matched pair only when all of K descriptors are matched to each other.

$$\phi_i \doteq \phi_j \Leftrightarrow \bigcap_{k=1}^{K} (\phi_{ik} \doteq \phi_{jk}), \forall i, j \in [1, \ldots, M]$$

where $\doteq$ denotes the match indicator. Since every pair of descriptors ($\phi_{ik}$ and $\phi_{jk}$) match to each other, each pair belongs to the same visual word $v_k$ and, $\phi_i$ and $\phi_j$ belong to the same visual phrase v. Thus, the matching of two local regions can be determined efficiently by assigning the regions to the visual phrase.

Different types of coherency can be enforced by designing different types of visual phrase, where K descriptors are generated in different ways. In the following description, two types of visual phrase are described, where feature and spatial coherency can be enforced.

The first type of visual phrase is the feature coherent phrase (FCP). By extracting multiple types of local descriptors from a local region, the visual phrase can be constructed that includes different types of descriptors. For example, an FCP of order two can be generated as follows, $$\phi_i(2) = \{\phi_{i1} = D_{sift}(R_i), \phi_{i2} = D_{spin}(R_i)\}$$

where $R_i$ indicates the $i^{th}$ local region, $D_{sift}(R_i)$ and $D_{spin}(R_i)$ are the corresponding SIFT and spin descriptors extracted from $R_i$. FCP enforces the coherency across different types of features between two matched local regions. When matching two FCPs using the above matching equation, every feature of two local regions is matched for matching these two regions.

For descriptors of the $k^{th}$ type used in FCP, k-means clustering is performed to obtain $V_k$ visual words of the $k^{th}$ type $V_k = \{v_1, v_2, \ldots, v_{V_k}\}$. K codebooks of visual words are obtained for K different types of descriptor. Note that the codebook size $V_k$ can be different for different types of descriptor. For every local region, K descriptors are mapped to an FCP (K-tuple of visual words) by assigning every descriptor to some visual word in the corresponding codebook of the same type, separately.

The second type of visual phrase is the spatial coherent phrase (SCP). Every local region is associated with a scale, which is either provided by a detector or fixed for dense sampling. A local descriptor is commonly extracted from a region of such scale, denoted as a description scale. According to the assumption of spatial coherency, the neighborhoods of two matched regions are likely to match to each other. This motivates the design of the SCP.

Given a local region i as well as the associated description scale so, so can be expanded to multiple expanded scales as $$s_k = C \cdot s_{k-1}, k \in [1,2,\ldots,K]$$

where the constant C is the expansion ratio between two consecutive scales. K descriptors are extracted from the expanded regions of these K scales using only one type of descriptor, $$\phi_i = \{\phi_{ik} = D(R_{i,s_k}) | k \in [1,2,\ldots,KJ]\}$$

where $R_{i,s_k}$ denotes the local region of scale $s_k$ centered at the same center of the local region i, and $D(R_{i,s_k})$ denotes the descriptor (e.g., SIFT) extracted from $R_{i,s_k}$.

SCP enforces the coherency across different spatial neighborhoods of two matched regions. Two local regions are matched only when the associated spatial neighborhoods of K expanded scales centered at the same center are consistently matched.

Similar to FCP, k-means clustering is performed on all the available descriptors of one type used in SCP. The obtained $V_k$ visual words, where $V_k = \{v_1, v_2, \ldots, v_{V_k}\}$, form a codebook of single descriptor type. A local region is mapped to a SCP (K-tuple of visual words of the same type) by assigning K descriptors to some visual word in the single codebook, separately.

The disclosed coherent phrase model provides a general framework for incorporating coherency across multiple descriptors of every local region. The proposed FCP introduces the feature coherency across different types of descriptors, and SCP introduces the spatial coherency across neighborhoods of different scales. Both of the FCP and SCP coherencies can effectively reduce the number of false matches due to the ambiguity of a single local descriptor and the errors caused by k-means clustering.

Besides FCP and SCP, it is possible to design other visual phrases to incorporate other forms of coherency. One example is to combine the disclosed FCP and SCP into a hybrid phrase that considers both feature and spatial coherency.

The disclosed framework for IND retrieval uses two parts: a process for database initialization and a process for handling input query. The offline process for database initialization includes locating local regions, and extracting descriptors from every local region for all images in the database. Here, dense sampling can be used to extract descriptors on an overlapped 8×8 grid to cover the whole image. This sampling avoids the risk of losing some information by using only specific detectors and also avoids the detection of interesting points. In terms of descriptors, SIFT and spin descriptors are used for FCP, and only a SIFT descriptor is used for SCP.

The offline process can also include building the codebook (s) for different types of descriptors. This includes applying k-means clustering on all descriptors of every type and then generating the codebook(s). Note that hierarchical k-means clustering can be used to generate the codebook and the histogram for multiple resolutions.

The offline process can also include assigning local regions to visual phrases, and forming the histogram of visual phrase frequency for every image. Every local region is assigned to a visual phrase by assigning every individual descriptor to some visual word of the same type separately, and obtaining the K-tuple of visual phrase.

For online query processing, the histogram of visual phrase frequency is calculated in a similar way for the query image. The histogram is then used to calculate the similarity between the query image and every image in the database. The similarity can be calculated by using any distance (e.g., L2 distance, $x^2$ distance, as well as EMD (earth movers distance), etc.) for two histograms. Here, the intersection distance $\tau$ is used to measure the similarity between two histograms $H_I$ and $H_J$ of visual phrase frequency.

$$\tau(H_I, H_J) = \sum_{v=1}^{V} \min(H_v(I), H_v(J))$$

where $H_v(\bullet)$ represents the $v^{th}$ bin of the histogram. Although straightforward, the intersection distance can handle partial matching with a cluttered background. The distance technique selected can be replaced by the PMK (pyramid match kernel) technique when extending to a multi-resolution histogram by considering hierarchical codebook(s). Herein, the simple intersection distance is used to show the effectiveness of the disclosed coherent phrase model.

The disclosed architecture preserves efficiency over the retrieval frameworks using the standard Bag-of-Words model, especially for the online processing of queries. For the initialization of the database (which can be performed offline), an additional computation can be utilized for the processes of locating regions and extracting descriptors, and the processes of assigning regions and forming the histogram, to extract and assign multiple, rather than single descriptors for every local region. However, this is an offline process, and therefore, has a negligible impact.

Although the space of visual phrases is explored, which is a combination of K visual words, there is no need to build the codebook of a visual phrase. This is because individual descriptors are assigned separately to a visual word, and only the codebook(s) of visual words are built, the size of which is much smaller than the actual number of all possible visual phrases. For example, building two codebooks with the same size of 500 each for SIFT and spin, local regions can be mapped to 500×500=250,000 different visual phrases of order two.

Compared to the standard Bag-of-Words model, the performance of the disclosed coherency model facilitates the use of smaller codebooks of visual words. This is because the visual phrase combines K visual words and has larger discriminant power. This reduces the computation complexity of assigning local regions to visual phrases. When assigning individual descriptors of a local region to visual words, the number of comparisons is reduced by using smaller codebooks. Because the process to initialize the database can be completed before the query is submitted, the complexity of the query does not affect the efficiency for online process of the query.

For online query processing, the disclosed coherency model (that employs image representation using visual phrases) preserves the sparsity of the Bag-of-Words representation. Suppose there are M local regions in an image, and the maximum number of non-zero bins in the histogram of visual phrase frequency is M, which is the same as that in Bag-of-Words representation. Because of this sparsity, the computation of the similarity between two images is very efficient.

Note that conventional graph-based methods presuppose the explicit finding of the correspondences between two images, and thus, results in a higher computational complexity. For the methods that utilize the relationship between K local regions, the maximum non-zero bins of the histogram are increased to $M^K$.

As a general but not exhaustive summary, the disclosed coherent phrase model for near-duplicate image retrieval enforces coherency across multiple descriptors for every local region. The two types of visual phrase (FCP and SCP) represent feature and spatial coherency and can be utilized without increasing the computational complexity. The FCP utilizes the information of different features by enforcing the feature coherency across multiple types of descriptors for every local region, and the SCP utilizes spatial information by enforcing the spatial coherency across the spatial neighborhoods of different sizes around every local region. Moreover, the disclosed model improves the matching accuracy by reducing the number of false matches and preserves the matching efficiency because of the sparsity of the representation.

In other words, a computer-implemented image processing system is provides that comprises an input component for receiving an image having local regions, an extraction component for extracting multiple descriptors from a local region that characterize appearance of the local region, a build component for building multiple codebooks of visual words using clustering on each type of descriptor, and a coherency component for characterizing each local region as a visual phrase of the multiple descriptors. The coherency component generates a feature coherency phrase that characterizes each local region by multiple descriptors of different types and a spatial coherency phrase where multiple descriptors of a single type are generated from spatial neighborhoods of different description scales proximate the local regions. The feature coherency phrase employs SIFT and spin descriptors. The graphing component generates a histogram of visual phrase frequency for the descriptors.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
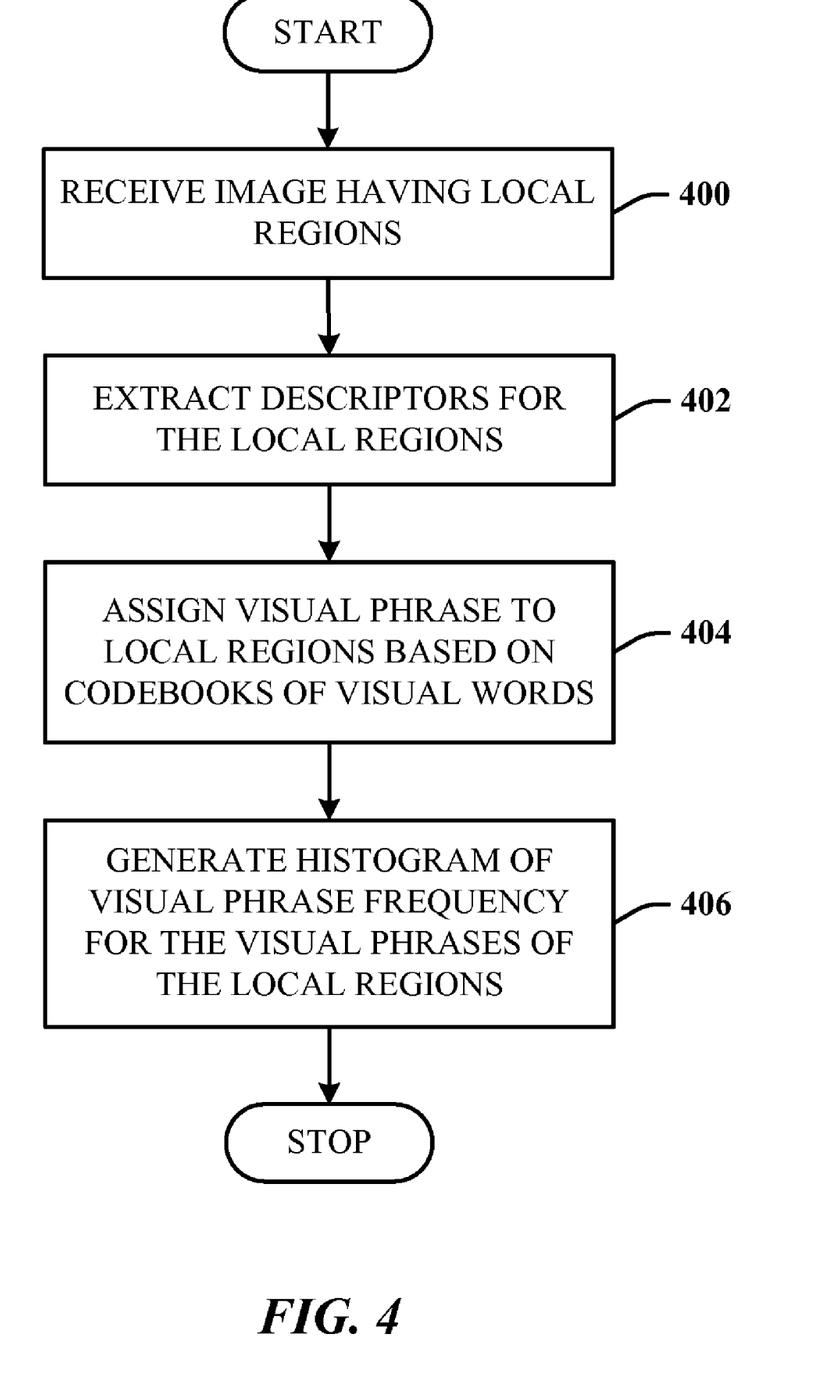
FIG. 4 illustrates a method of processing images in accordance with the disclosed architecture.

FIG. 4 illustrates a method of processing images in accordance with the disclosed architecture. At 400, an image having local regions is received. At 402, descriptors for the local regions are extracted. At 404, a visual phrase is assigned to the local regions based on codebooks of visual words. At 406, a histogram of visual phrase frequency of the visual phrases is generated for the local regions.

The method can further comprise matching two local regions based on coherency across different spatial neighborhoods and/or matching two local regions based on coherency across different types of features.

Figure 5:
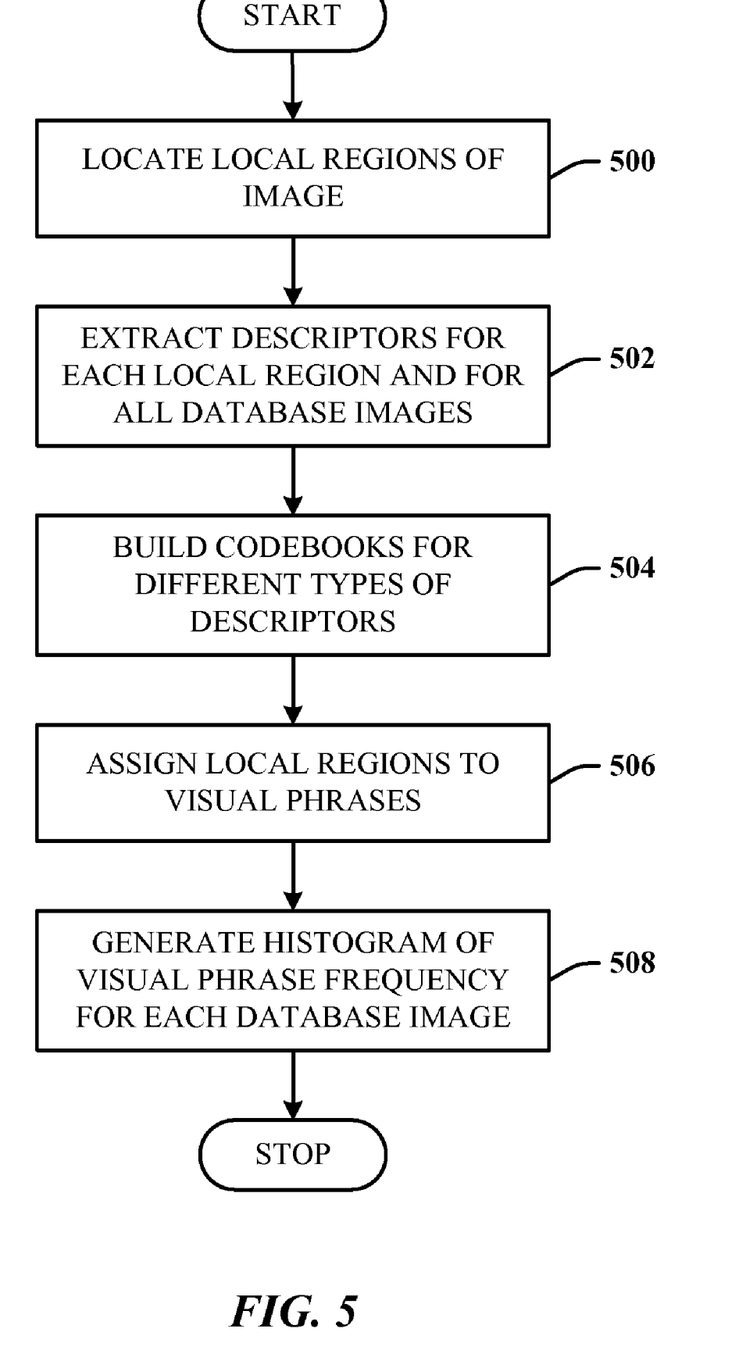
FIG. 5 illustrates a method of offline processing for database initialization.

FIG. 5 illustrates a method of offline processing for database initialization. At 500, local regions of an image are located. At 502, descriptors are extracted for each local region and for all images of the database. As previously indicated, dense sampling of an overlayed x×y grid can be employed. At 504, codebooks for different types of descriptors are built. At 506, local regions are assigned to visual phrases. At 508, a histogram of visual phrase frequency is generated for each database image.

Figure 6:
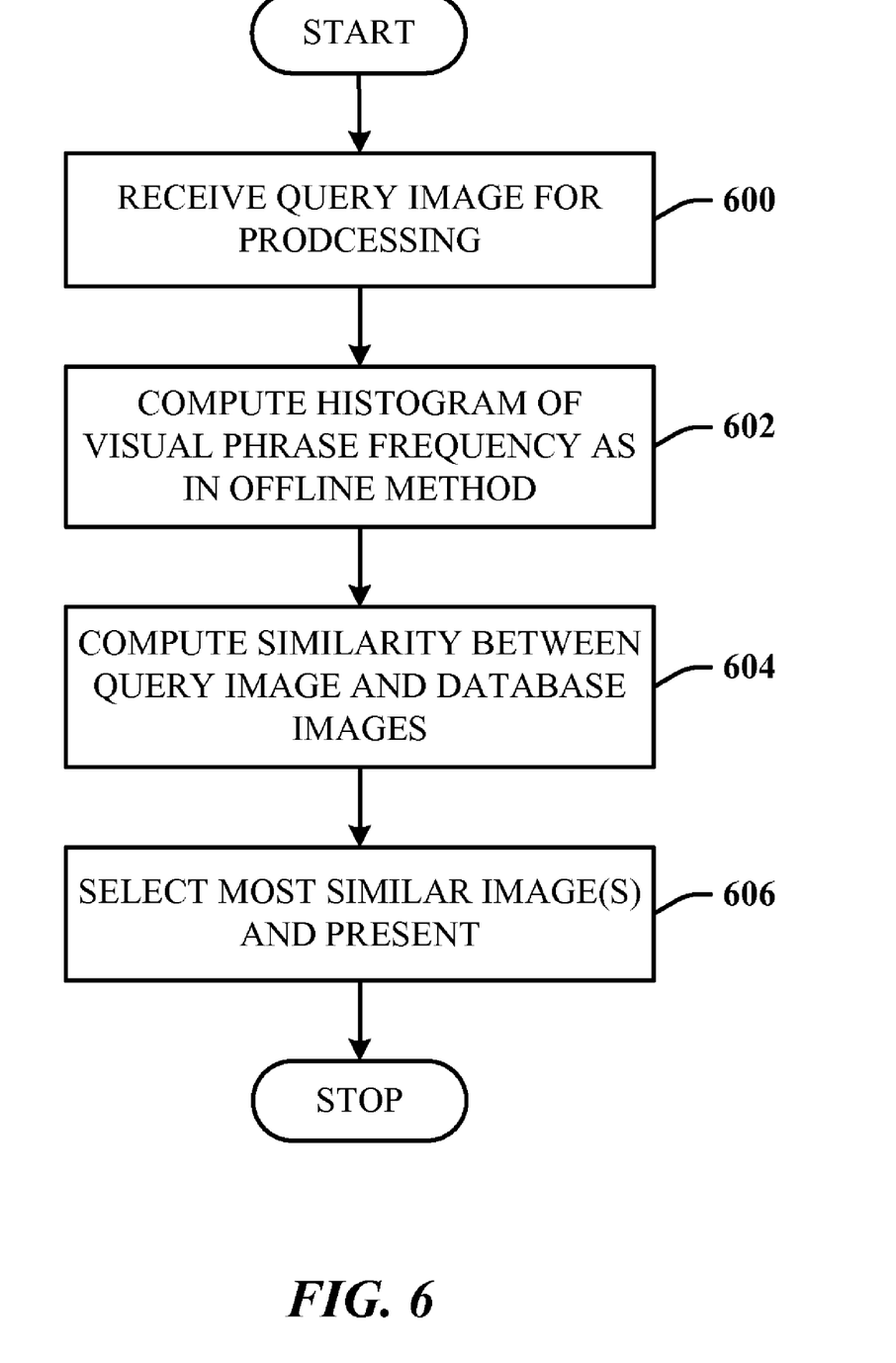
FIG. 6 illustrates a method of online processing of a query image.

FIG. 6 illustrates a method of online processing of a query image. At 600, a query image is received for processing. At 602, a histogram of visual phrase frequency is computed as in the offline method. At 604, similarity between query image and database images is computed. At 606, the most similar image(s) is selected and presented.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
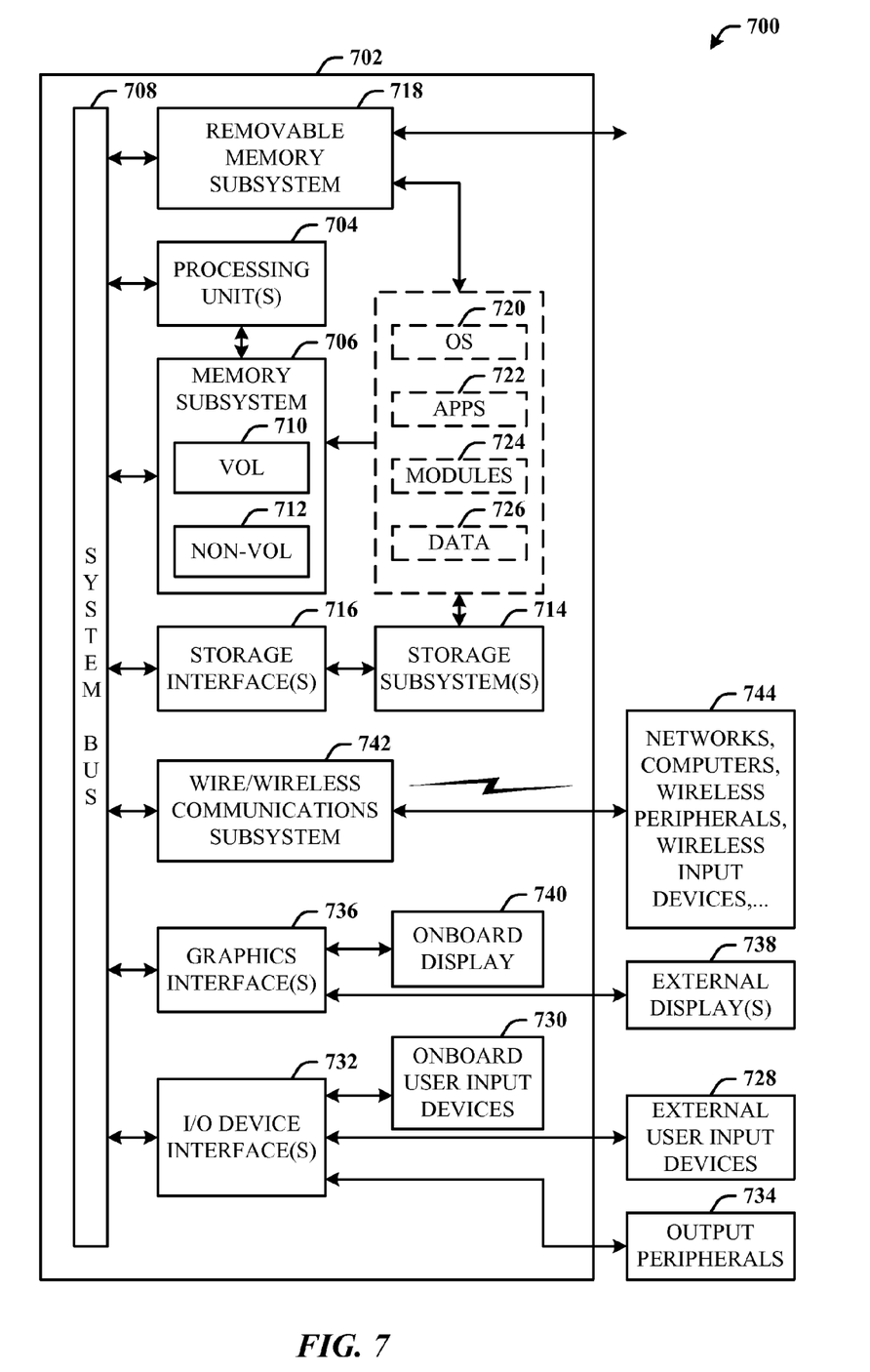
FIG. 7 illustrates a block diagram of a computing system operable to execute a coherency phrase model in accordance with the disclosed architecture.

Referring now to FIG. 7, there is illustrated a block diagram of a computing system 700 operable to execute a coherency phrase model in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714, including an operating system 720, one or more application programs 722, other program modules 724, and program data 726. When employed as a server machine, for example, the one or more application programs 722, other program modules 724, and program data 726 can include the input component 102, coherency component 108, visual phrase 110, extraction component 202, build component 204, graphing component 206, processes of FIG. 3, and methods of FIGS. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wire/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wire/wireless communication subsystem 742 (e.g., a network interface adapter, onboard transceiver subsystem, etc.) to communicate with wire/wireless networks, wire/wireless printers, wire/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
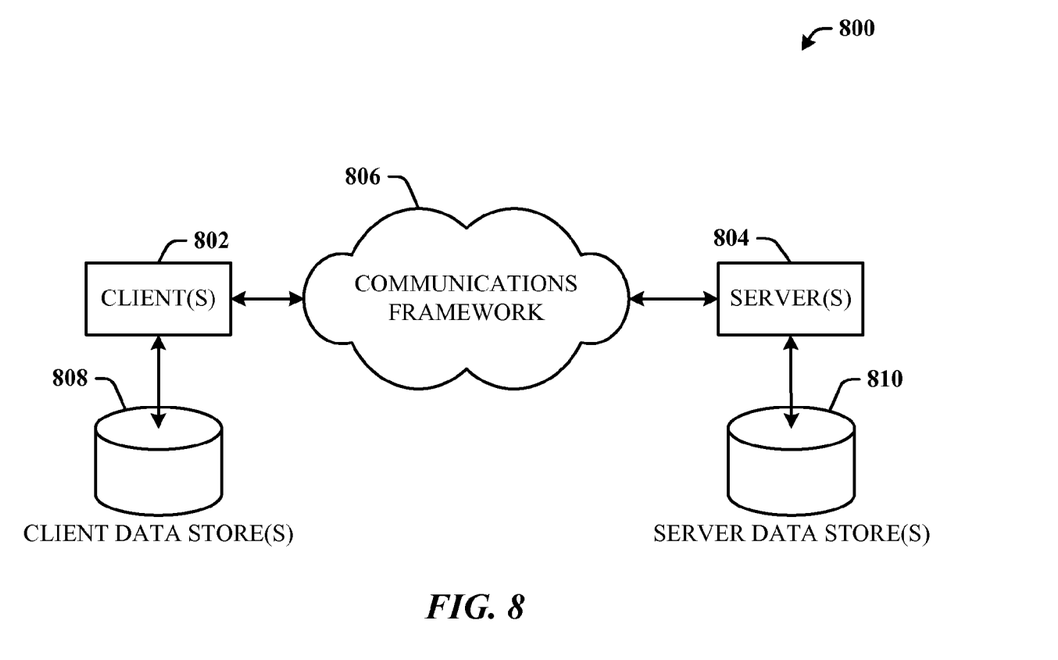
FIG. 8 illustrates a schematic block diagram of a computing environment for executing the coherency phrase model.

Referring now to FIG. 8, there is illustrated a schematic block diagram of a computing environment 800 for executing the coherency phrase model. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

The server(s) 804 can include the system 100 of FIG. 1, system 200 of FIG. 2, flow and processes of FIG. 3, and methods of FIGS. 4-6, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented image processing system, comprising:
    an input component for receiving an image having local regions;
    a coherency component for characterizing each local region of the image as a visual phrase of multiple descriptors; and
    a processor that executes computer-executable instructions associated with at least one of the input component or the coherency component.

2. The system of claim 1, wherein the coherency component generates a feature coherency phrase that characterizes each local region by multiple descriptors of different types.

3. The system of claim 2, wherein the feature coherency phrase employs scale-invariant feature transform descriptors (SIFT) and spin descriptors.

4. The system of claim 2, wherein the feature coherency phrase enforces coherency across different types of features between two matched local regions.

5. The system of claim 1, wherein the coherency component generates a spatial coherency phrase where multiple descriptors of a single type are generated from spatial neighborhoods of different description scales proximate the local regions.

6. The system of claim 1, further comprising an extraction component for extracting multiple descriptors from a local region that characterize appearance of the local region.

7. The system of claim 1, further comprising a build component for building multiple codebooks of visual words using clustering on each type of descriptor.

8. The system of claim 7, wherein each local region is assigned to a visual phrase based on the codebooks.

9. The system of claim 1, further comprising a graphing component for generating a histogram of visual phrase frequency.

10. A computer-implemented image processing system, comprising:
    an input component for receiving an image having local regions;
    an extraction component for extracting multiple descriptors from a local region of the image that characterize appearance of the local region;
    a build component for building multiple codebooks of visual words using clustering on each type of descriptor;
    a coherency component for characterizing each local region of the image as a visual phrase of the multiple descriptors; and
    a processor that executes computer-executable instructions associated with at least one of the input component, the extraction component, the build component or the coherency component.

11. The system of claim 10, wherein the coherency component generates a feature coherency phrase that characterizes each local region by multiple descriptors of different types and a spatial coherency phrase where multiple descriptors of a single type are generated from spatial neighborhoods of different description scales proximate the local regions.

12. The system of claim 11, wherein the feature coherency phrase employs scale-invariant feature transform descriptors (SIFT) and spin descriptors, and the spatial coherency phrase employs SIFT descriptors.

13. The system of claim 10, further comprising a graphing component for generating a histogram of visual phrase frequency for the descriptors.

14. The system of claim 10, wherein each local region is assigned to a visual phrase based on the codebooks.

15. A computer-implemented method of processing images, comprising acts of:
    receiving an image having local regions;
    extracting descriptors for the local regions of the image;
    assigning a visual phrase to the local regions of the image based on codebooks of visual words; and
    generating a histogram of visual phrase frequency of the visual phrases of the local regions of the image; and utilizing a processor that executes instructions stored in memory to perform at least one of the acts of receiving, assigning or generating.

16. The method of claim 15, further comprising matching two local regions based on assigning the local regions to a visual phrase.

17. The method of claim 15, further comprising calculating similarity between a query image and a database image based on similarity between a histogram of the query image and a histogram of the database image.

18. The method of claim 17, wherein the similarity is computed as a distance between the histogram of the query image and the histogram of the database image.

19. The method of claim 15, further comprising matching two local regions based on coherency across different spatial neighborhoods.

20. The method of claim 15, further comprising matching two local regions based on coherency across different types of features.

* * * * *